though the feeding arrangement 3, as the
UNITED STATES PATENT OFFICE.

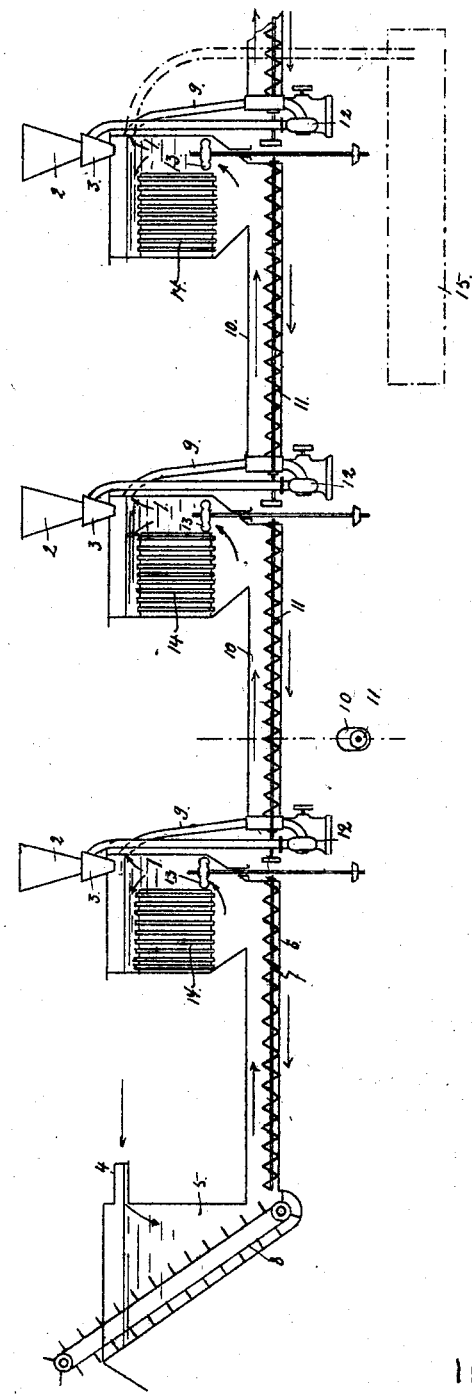

PER BENGTSSON HÄRJE, OF LILLA HARRIE, SWEDEN.

METHOD OF PRODUCING SACCHARATE OF LIME.

No. 795,797. Specification of Letters Patent. Patented July 25, 1905.

Application filed December 3, 1902. Serial No. 133,754.

*To all whom it may concern:*

Be it known that I, PER BENGTSSON HÄRJE, engineer, a subject of the King of Sweden and Norway, and a resident of Lilla Harrie, Örtofta, in the Kingdom of Sweden, have invented certain new and useful Improvements in Methods of Producing Saccharate of Lime, of which the following is a specification, reference being made to the accompanying drawing.

The present invention relates to a method for continuously producing saccharate of lime and to an apparatus for the execution of this method.

The method in question is chiefly characterized by the fact that the saccharine solution—for instance, a solution of molasses—of which the saccharate of lime is to be produced is driven to and through a series of chambers in which the sugar in the saccharine solution is transformed into saccharate of lime in such a manner that there are first formed soluble compounds of saccharate of lime and subsequently the insoluble compound, (or compounds,) which can thereupon be treated in a suitable way—*e. g.*, in filter-presses. To obtain a saccharate of lime as rich as possible in sugar, that portion of the lime employed in the process which has not combined with the sugar is allowed to separate or is separated, consequently being not conducted away with the insoluble saccharate of lime, and the lime thus separated can preferably be conducted in a current counter to the matter passing through the reaction-chambers referred to, being brought into contact with the saccharine solution for the formation of soluble (or insoluble, as the case may be) saccharate-of-lime compounds and with the soluble saccharate-of-lime compounds for the formation of an insoluble saccharate-of-lime compound, (or saccharate-of-lime compounds,) whereby a considerable saving of lime is achieved. Before the introduction of the saccharine solution into the apparatus, consisting of a series of reaction-chambers, the solution may be treated with lime, so that all the sugar or a portion thereof is transformed into soluble saccharate of lime.

On the annexed drawing an apparatus for the execution of the method in question is shown schematically and by way of example. The apparatus consists of a series of vessels or chambers 1, above which are placed hoppers 2 for the lime with which the sugar in the saccharate solution is to be transformed. The lime is fed down to the reaction-chambers 1 with the assistance of some arrangement 3 suitable for the purpose. The saccharine solution is conducted to the first reaction-chamber through a conduit 4 5 6. The lower horizontal portion 6 of this conduit contains a worm-screw 7, (or other suitable conveyer,) extending from that end of the conduit portion 6 which is connected with the first reaction-chamber to the other end of said portion, where is placed an arrangement—*e. g.*, an endless conveyer—situated at portion 5 of the conduit for elevating the material (lime) which has been brought to the same by the worm-screw. From the upper portion of the first reaction-chamber a conduit 9 leads to one extremity of a horizontal conduit 10, which like the conduit 6 contains a worm-screw 11, (or other conveyer,) and with its other extremity communicates with the lower portion of the second reaction-chamber, while at the first-mentioned extremity of said conduit is an arrangement—*e. g.*, an endless conveyer or, as shown, a centrifugal pump 12—for the elevation of the material (lime) brought to it by the worm-screw 11, which material thereupon enters the upper portion of the first reaction-chamber or through the feeding arrangement 3, as the case may be. The second reaction-chamber is connected with the third, the third with a fourth, &c., in the same way as the first with the second. In each and every one of the reaction-chambers by means of a serviceable arrangement—*e. g.*, a propeller 13—an active circulation is kept up, so that the lime is brought into intimate contact with the contents of the chamber, which are cooled in a suitable way—*e. g.*, by means of a system of tubes 14.

The apparatus described works in the following way: In the first reaction-chamber (or the first reaction-chambers) the sugar in the saccharine solution (for instance, a solution of molasses) is transformed into soluble saccharate of lime, (also insoluble saccharate of lime is formed, as the case may be,) which in the subsequent reaction-chambers is transformed into insoluble saccharate of lime, which, suspended in the mother-liquor, is conducted away from the last reaction-chamber. When the matter to which the lime has been added passes through the conduits 10, that portion of the lime which has not combined with the sugar deposits itself on the bottom of these conduits and is conducted by the worm-screws 11 to the centrifugal pumps 12. The conduits 10, at the bottoms of which the worm-screws 11 are placed, have so large a cross-section that the matter can flow with comparative tranquility forward over the worm-screws, (which act in a direction counter to the direction of flow of the matter,) so that the excess of lime, or at least the greatest portion of same, has time to deposit itself in the conduits. The lime which has deposited itself in a conduit 10 is conveyed by the worm-screw and the centrifugal pump to the reaction-chamber situated nearest behind and is there brought into intimate contact with soluble saccharate of lime, thereby forming a higher saccharate-of-lime compound, thus saving fresh lime. The lime which deposits itself in the conduit 6 and is led back by the worm-screw 7 and the endless conveyer 8 is conducted away as waste, which, if desired, can be again employed in the manufacture. By permitting the excess of lime to deposit itself and by bringing the same in contact with the sugar and the soluble saccharate of lime there is attained not merely an economy of fresh lime, but also that the product obtained—*i. e.*, insoluble saccharate of lime suspended in its mother-lye—is especially free from lime in excess. In case the product should not be sufficiently free from lime it can prior to the subsequent treatment—*e. g.*, in filter-presses—be conducted through a vessel in which the lime may deposit itself and whence it can be continuously removed. Such a vessel 15 is suggested in the drawing by means of dotted lines.

In carrying out this method I prefer to introduce lime which does not combine so easily or readily with sugar into the first reaction chamber or chambers and lime having a more energetic action into the last reaction chamber or chambers. The activity of the lime may increase gradually from the first reaction-chamber to the last one.

In the production of saccharate of lime according to the process described a great advantage is gained if the saccharine solution (or solutions) is permitted during the operation to be altered, either at intervals of time or continuously, as to the percentage of impurities, (non-sugar percentage.)

Having now described my invention, what I claim as new, and desire to secure by Letters Patent, is—

1. The herein-described method of continuously producing saccharate of lime which consists in introducing lime at different points into a progressively-moving saccharine solution and separating the lime which has not combined with the sugar in the solution, substantially as described.

2. The herein-described method of continuously producing saccharate of lime which consists in introducing lime at different points into a saccharine solution flowing in one direction, and withdrawing the precipitated lime and returning it in a direction counter to that of the saccharine solution thereby effecting a saving in fresh lime, substantially as described.

In witness whereof I have hereunto set my hand in presence of two witnesses.

PER BENGTSSON HÄRJE.

Witnesses:
HANS B. OHLSSON,
CARL TH. SUNDHOLM.